United States Patent [19]

Samide

[11] 4,047,750

[45] Sept. 13, 1977

[54] OVERHEAD GUARD-BATTERY BALLAST

[75] Inventor: Frank Richard Samide, Chardon, Ohio

[73] Assignee: Towmotor Corporation, Mentor, Ohio

[21] Appl. No.: 706,345

[22] Filed: July 19, 1976

[51] Int. Cl.[2] .............................................. B62D 21/00

[52] U.S. Cl. ...................................................... 296/107

[58] Field of Search .................. 296/107, 102; 211/42; 280/756

[56] References Cited

U.S. PATENT DOCUMENTS

| | | | |
|---|---|---|---|
| 3,520,571 | 7/1970 | Rogers | 296/102 |
| 3,829,121 | 8/1974 | Ahrendt | 296/102 |
| 3,971,556 | 7/1976 | Petrie et al. | 211/42 |

*Primary Examiner*—Robert R. Song

*Attorney, Agent, or Firm*—Wegner, Stellman, McCord, Wiles & Wood

[57] ABSTRACT

An overhead guard assembly for use on forklift vehicles and the like, including upstanding support means being pivotally secured to the vehicle frame so as to allow the supports to rotate about a transverse axis between a first position wherein the supports extend vertically from the vehicle frame, and a second position wherein the supports extend forwardly and upwardly from the vehicle frame, and further including rigid base means extending rearwardly from the bottom of the supports, the base means being disposed beneath a removable, weighted element, such as a battery. Lifting of the weighted element releases the base means and allows the support means to rotate from the first position to the second position. An overhead guard surface is secured to the uppermost end of the support means.

8 Claims, 3 Drawing Figures

OVERHEAD GUARD-BATTERY BALLAST

BACKGROUND OF THE INVENTION

1. Field of the Invention

This invention relates to forklift-type vehicles and, more particularly, to overhead guard assemblies for said vehicles.

2. Description of the Prior Art

This invention relates to guard assemblies used on industrial vehicles such as forklift trucks and the like. The use of overhead guard surfaces to protect operators of forklift vehicles from falling material is well known. Use of such surfaces in connection with such vehicles is necessary as the vehicles are often used to elevate heavy and/or bulky materials above the head of the operator of the vehicle.

Many types of commonly used guard assemblies include a fixed horizontal surface extending over the area in which the operator sits or stands. This can create a problem in the case of electrically powered forklifts, as these vehicles often have a bulky, heavy battery situated generally centrally of the vehicle. It is often desirable to remove the battery for purposes of maintenance, etc., but a fixed guard assembly overlying the battery area can interfere with the quick and simple removal of the battery.

Previous guard assemblies have approached the problem in various ways. Such prior designs include guards which pivot to the side of the vehicle, guards which pivot rearwardly or forwardly of the vehicle, and a unitary construction involving a combination battery case, counterweight and overhead guard. See, for example U.S. Pat. Nos. 3,829,121 and 3,721,353.

SUMMARY OF THE INVENTION

It is an object of the invention to provide a new and improved overhead guard assembly for use in industrial vehicles, such as, forklift trucks and the like. More specifically, it is a object of the invention to provide an overhead assembly including a horizontal guard surface secured to vertical support means, the guard surface generally overlying an operator's station on a vehicle of the sort described above. The support means has at its lower extremity a rearwardly extending base means, upon which base means rests a heavy removable element such as a battery, for example. When the removable element is disposed in its operative position, it serves to secure the support means in a vertical position. Lifting of the element, such as by a chain hoist, serves to allow the support means to rotate forwardly of its vertical position, thereby positioning the guard surface forwardly of the removable element, allowing quick removal of the element by lifting.

One embodiment of the invention includes a stopping means on the forward edge of the support means designed to limit the degree of rotation of the support means by contact with an abutment surface, such as the floor of the vehicle, for example.

The preferred embodiment of the invention includes a second pivoting means whereby the upper portion of the support means, including the guard surface, may be rotated rearwardly in order to provide a more compact vertical dimension of the vehicle as a whole to facilitate travel of the vehicle through passageways of limited clearance.

Other features and advantages will become apparent from the following specification taken in connection with the accompanying drawings.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 1:
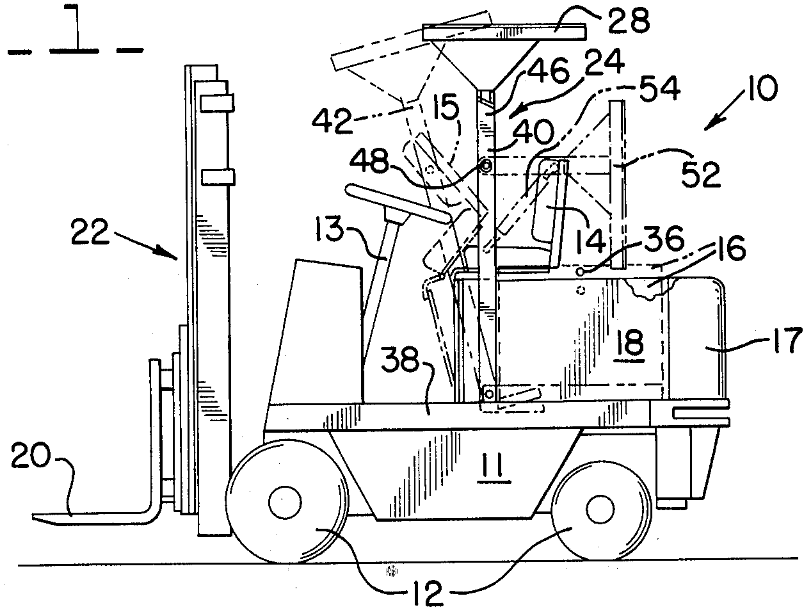
FIG. 1 is an elevational view of a forklift vehicle incorporating my improved overhead guard assembly.

Referring to FIG. 1, an exemplary embodiment of the invention includes a forklift or similar vehicle, generally designated 10, provided with motive means (not shown). The vehicle 10 shown in FIG. 1 is of a well-known type and comprises generally a frame 11 resting upon wheels 12 and is equipped with steering means 13 controlled by an operator (not shown) situated on operator's seat means 14. The seat means 14 is shown in its operative position by solid lines and in a non-operative position 15 by dotted lines.

A removable element 16 is situated generally beneath and rearwardly of the operators 's seat means 14 and forwardly of the counterweight 17 located on the rearmost portion of the vehicle 10. In the preferred embodiment, the removable element 16 comprises a battery provided as a power source for said motive means and will be referred to as such in the following, such reference being understood to be by way of example only, and not by way of limitation.

It may be noted that battery 16 may rest inside a compartment 18, the rear wall thereof being formed by said counterweight 17 and the side walls thereof being carried by the vehicle frame 11. Although the side walls of the compartment 18 are shown enclosing the sides of the battery 16, it is to be understood that the side walls of the compartment 18 may be relatively low covering only a few inches of the lower portion of the battery. Under any circumstances, it is necessary for the battery 16 to be lifted from its operative position to remove it from the vehicle. My improved overhead guard assembly is designed to be movable from an overhanging position to make it readily possible to attach a lift device to the battery for lifting the battery from its operative position in said compartment.

In operation, the vehicle 10 moves about a work environment on wheels 12, its function being to lift, transport and deposit heavy or bulky articles. Such articles are often situated on pallets into which the fork means 20 of a vertical conveyor assembly, generally designated 22, are inserted. The vertical conveyor assembly 22 is equipped with motor means (not shown) which allow the operator to raise and lower the fork means 20, thereby raising and lowering the article to be moved. The conveyor assembly 22 has telescoping means (not shown) which allow the operator to raise the material to a level higher than the top of the conveyor assembly as represented in FIG. 1.

The operator is situated on seat means 14 which may be located below and rearwardly of an object being supported on the fork means 20. Safety regulations require that the operator be protected from falling objects and, accordingly, it is desirable to equip the vehicle frame 11 with a guard structure designed to protect the operator from falling objects without interfering with the ready removal of the battery 16.

Figure 2:
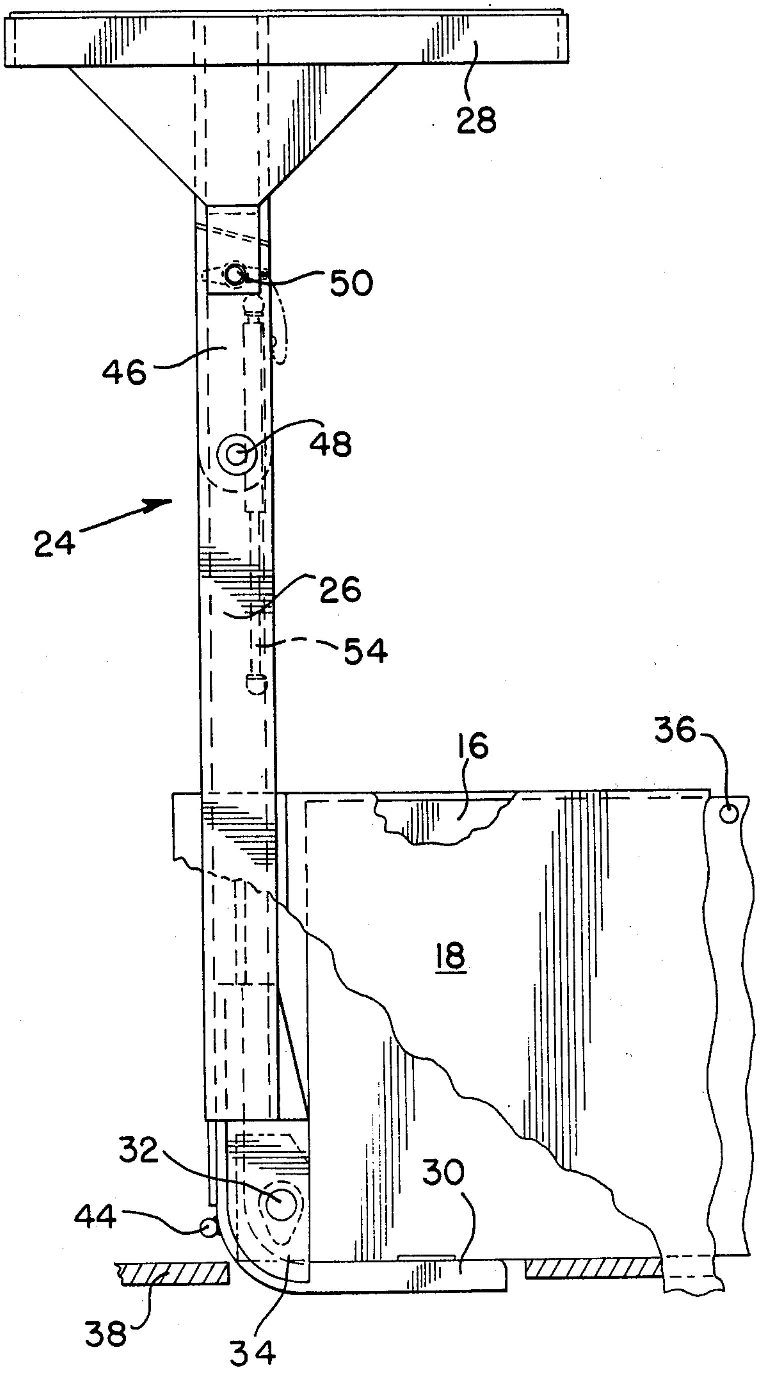
FIG. 2 is an enlarged elevational view of the overhead guard assembly with a portion of a removable vehicle element resting thereon.

Referring to FIG. 2, an overhead guard assembly, generally designated 24, is provided. The guard assembly 24 includes vertical support means 26, a guard surface 28 pivotally secured to the uppermost portion of support means 26, and a rigid base means 30 secured to and extending rearwardly from the bottommost portion of support means 26. In the preferred form of the invention shown, the base means 30 is formed integrally with and extends perpendicularly to said vertical support means 26.

Figure 3:
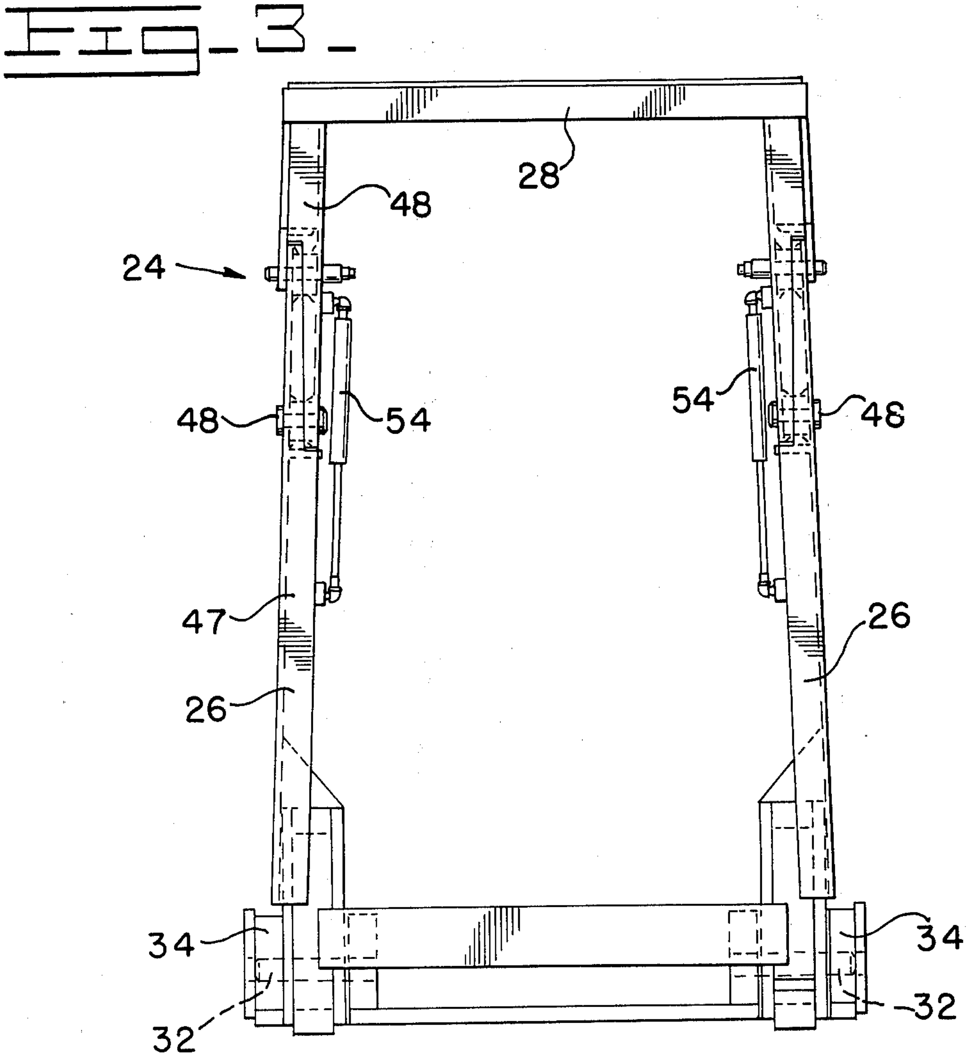
FIG. 3 is a front elevational view of the apparatus.

The guard assembly 24 is pivotally secured to the vehicle frame 11 so as to allow rotation about an axis transverse to the vehicle frame. Referring to FIG. 3, this is accomplished in a simple manner as by the extension of pivots 32 laterally of the support means 26 through perforate ears 34, said ears being an integral part of vehicle frame 11.

As shown in FIG. 2, the center of gravity of the guard assembly 28 is located forwardly of the transverse pivot axis defined by pivots 32. The assembly will, therefore, tend to rotate forwardly unless restrained. Retention is accomplished in FIG. 2 by means of leverage, the removable element 16 resting on base means 30. The weight of element 16 prevents the counterclockwise rotation (as shown in FIG. 2) of the base means 30, thereby maintaining the support means 26 in an upright position.

As stated above, one of the objects of the present invention is to allow quick and simple removal of the vehicle's power source, such as the battery 16, by lifting. In the preferred embodiment of the invention, the battery 16 may be removed by means of a chain hoist or similar lifting means (not shown) attached to the battery 16 at lifting holes 36, as shown in FIG. 1. Lifting of the battery 16 a small distance above the surface of the vehicle floor 38 to the position shown in phantom in FIG. 1 allows the guard assembly 24 to rotate forwardly by virtue of its own weight from its operative position 40 (shown in solid lines) to a non-operative position 42 (shown by dotted lines). Such rotation allows the guard surface 28 to assume a position forward of the line of upward travel of the battery 16, thus allowing removal of the battery 16 by a simple, upward lifting motion.

One embodiment of the invention, as shown in FIG. 2, includes stopping means 44, such as metal rod portions, secured to the forward edge of support means 26. Said stopping means 44 contact an abutment surface, such as the vehicle floor 38, as the guard assembly 24 rotates forward, thus stopping the motion of the guard assembly 24 as it reaches a desired degree of rotation. This feature is convenient as it allows the guard assembly 24 to maintain a position such that the base means 30 project at an acute angle from the vehicle floor 38. As battery 16 is lowered into its compartment 18, the battery 16 contacts the base means 30. As the battery 16 continues to be lowered, the weight of the battery 16 forces base means 30 to return to its operative position, thereby disposing support means 26 in a vertical position.

In the preferred embodiment of the invention, the uppermost portion 46 of the support means 26 is pivotally secured to the lowermost portion 47 thereof, as at pivot point 48 (see FIG. 2). Removal of the captive pin 50 in FIG. 2 allows the uppermost portion 46 to rotate rearwardly to a non-operative position 52 as shown by dotted lines in FIG. 1. Such a configuration of the guard assembly 24 is convenient, as it allows the vehicle 10 to travel through passageways of limited clearance. As shown, a pair of hydraulic cylinders 54 are connected between the lowermost portion 47 of the support means 26 and the uppermost portion 46 thereof. The cylinders 54 are operative to raise and lower the guard surface 28 about the pivot 48. The details of operating said cylinders 54 to move the guard surface are not described as they form no part of the present invention.

I claim:

1. An overhead guard assembly for industrial vehicles having a frame and a weighted member carried by said frame, the overhead guard assembly comprising:

upstanding support means pivotally secured to said frame, said support means being mounted so as to allow rotation of said support means about a transverse pivot axis between a first position wherein said support means extend vertically and upwardly of said pivot axis, and a second position wherein said support means extend forwardly and upwardly of said pivot axis;

rigid base means rigidly connected to and extending rearwardly from and perpendicularly to the lower portion of said support means, said base means being disposed beneath and under the influence of said weighted member when the support means is disposed in said first position and said base means extending upwardly and rearwardly of the transverse pivot axis when said weighted member is lifted from said frame and the support means is disposed in said second position; and, a guard surface secured to the upper end of said support means.

2. The overhead guard assembly of claim 1 wherein said support means includes stopping means on the forward surface of said support means, which stopping means rests against an abutment surface when the support means is disposed in said second position.

3. The overhead guard assembly of claim 1 wherein the support means include an uppermost portion pivotally secured to a lowermost portion of said support means so as to allow rotation of said uppermost portion between a first position in which said uppermost portion extends vertically and upwardly from said lowermost portion and a second position in which said uppermost portion extends rearwardly from said lowermost portion.

4. The overhead guard assembly of claim 1 wherein said support means include two spaced members mounted on opposite sides of said vehicle frame.

5. The overhead guard assembly of claim 1 wherein said weighted element is a power source.

6. The overhead guard assembly of claim 5 wherein said power source is a battery.

7. An overhead guard assembly for industrial vehicles having a frame, upstanding support means pivotally secured at the lower end portion thereof to said frame for movement between an upright position and a tilted position, a guard surface secured to the upper end of said support means, and base means rigidly connected to and extending perpendicularly from said lower end portion of said support means, said base means being disposed in position to be engaged by a weighted member whereby the support means is disposed in said upright position and whereby said base means and said support means tilt when said weighted member is lifted.

8. The overhead guard assembly of claim 7 wherein said support means has a stop on the forward surface of said support means, which stop rests against an abutment surface when the support means is tilted.

* * * * *